Aug. 19, 1952     J. W. KEHOE     2,607,808
THERMOCOUPLE AND MOUNTING CLAMP THEREFOR
Original Filed Feb. 28, 1945

INVENTOR.
JAMES W. KEHOE
BY
ATTORNEY

Patented Aug. 19, 1952

2,607,808

UNITED STATES PATENT OFFICE 2,607,808

THERMOCOUPLE AND MOUNTING CLAMP THEREFOR

James W. Kehoe, Shelby, Ohio

Continuation of application Serial No. 580,263, February 28, 1945. This application November 7, 1949, Serial No. 126,001

1 Claim. (Cl. 136—4)

(Granted under the act of March 3, 1883, as amended April 30, 1928; 370 O. G. 757)

This invention relates to new and useful improvements in thermocouples, and more particularly to thermocouple terminals or junctions.

In many instances in industrial and laboratory work it is desirable or necessary to determine the temperature of an object by the use of a thermocouple. Heretofore, in the use of thermocouples it has been the practice to solder or weld the thermocouple terminal or junction to the surface of the object at the point thereon at which it is desired to determine the temperature. In numerous cases such as, for example, electric cables, fluid pipes and conduits, rods and the like, it is not feasible or desirable to weld or solder a thermocouple terminal or junction to the object because of possible damage thereto, and prior to the present invention the use of thermocouples to determine temperature has been prohibited in such cases. Furthermore, even in cases where it is feasible to solder or weld a terminal or junction to such an object, considerable time and effort is required to do so.

This application is a continuation of application Serial No. 580,263, filed February 28, 1945, now abandoned, for Thermocouple Junction.

With the foregoing in mind, the present invention has for its principal object the provision of a novel thermocouple terminal or junction that may be readily and quickly applied to and removed from objects of generally circular cross-section shape such as for example, electric cables, fluid pipes and conduits, rods, bearings, and the like.

Another object of the present invention is to provide a novel thermocouple terminal or junction that may be attached mechanically to an object of the character set forth without welding or soldering.

A further object of the invention is to provide a novel thermocouple terminal or junction having the stated features which is highly efficient in operation, and characterized by its relatively simplified, inexpensive construction.

These and other objects of the invention, and the various features and details of the construction and operation thereof, are hereinafter fully set forth and described with reference to the accompanying drawing, in which.

Figure 1:
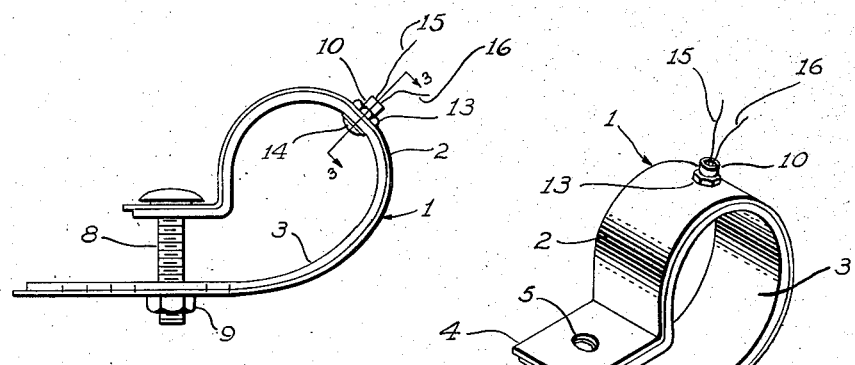
Fig. 1 is a view in elevation of a thermocouple terminal or junction device embodying the present invention.
Figure 2:
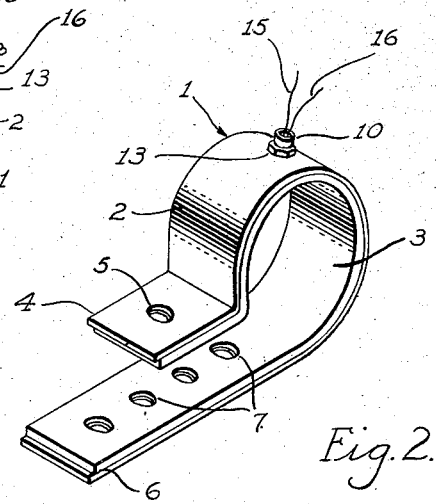
Fig. 2 is a view in perspective of the device shown in Fig. 1 with the bolt or other securing means removed.

Referring now to the drawing, and more particularly to Figs. 1 and 2 thereof, a thermocouple terminal or junction made according to the present invention may comprise a generally U-shaped body structure 1 consisting of a backing strip 2 of predetermined length and a liner strip 3 that underlies the backing strip 2 so as to be interposed between the latter and the surface of the object upon which the device is secured. The backing strip 2 preferably is composed of relatively flexible material such as, for example, sheet metal or the like that may be conformed readily to the exterior surface configuration of a cable, pipe, conduit, rod, bearing or similarly shaped object whose temperature is to be determined, and the liner strip 3 preferably is composed of flexible dielectric material such as, for example, rubber or a suitable composition material. The liner strip 3 may be secured to the backing strip 2 by a suitable cement or glue that is relatively flexible when set.

Adjacent one end 4 of the body 1 there is provided a single opening 5, and adjacent the other end 6 of said body there is provided a series of aligned openings 7 spaced at intervals lengthwise thereof. The opening 5 is arranged to receive suitable clamping means such as a bolt or the like 8 that also extends through a selected one of the openings 7 adjacent the other end 6 of the body depending upon the size of the object about which the device is to be clamped. With the bolt 8 positioned in the proper opening 7 of the body, the device may be securely clamped about the surface of the object by tightening a nut or the like 9 upon the bolt 8.

Figure 3:
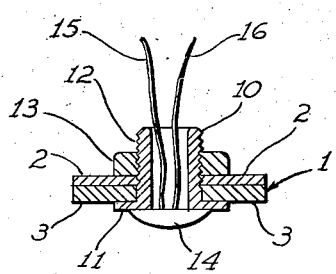
Fig. 3 is an enlarged sectional view taken on line 3—3, Fig. 1.

Extending through the body 1 at a point lengthwise thereof that is relatively remote from the ends thereof, is an insulator or sleeve 10 that is composed of suitable dielectric material as best shown in Fig. 3 of the drawing, this insulator or sleeve 10 may be provided with a radial flange 11 at its inner end arranged to underlie the adjacent surface of the body liner 3, and the exterior of said sleeve may be threaded as indicated at 12 to receive a nut or similar member 13 to be tightened against the exterior surface of the body 1 and secure the sleeve 10 against displacement from the body.

Suitably secured at the inner end of the sleeve 10 and arranged for contact with the surface of the object about which the body 1 is clamped, is a thermocouple junction or contact 14 to which is connected, such as by soldering or the like, a pair of conductors 15 and 16 that extend or pass through said sleeve 10 and lead outwardly from the device for connection to any selected standard thermocouple circuit. In accordance with conventional thermocouple practice, the contact 14 preferably is composed of a metal having high electrical conducting properties such as, for example, silver solder, and the conductors 15 and 16 preferably are composed of constantan and copper or iron, respectively.

The provision of the liner 3 intermediate the backing strip 2 and the surface of the object to which the device may be applied serves effectively to eliminate all thermo-electric circuits except at the thermocouple junction contact 14, and, in addition to its dielectric properties, the liner 3 functions also to thermally insulate the terminal or junction 14 from the effect or influence of heat sources extraneous or adjacent the object to which the device may be secured. In this manner, the invention provides a simple unitary thermocouple of general applicability, wherein a single point contact is firmly engaged with the object to be tested, and wherein are eliminated all errors due either to other thermo-electric circuits in proximity to the contact or to the influence of heat sources extraneous to or adjacent the object.

Figure 4:
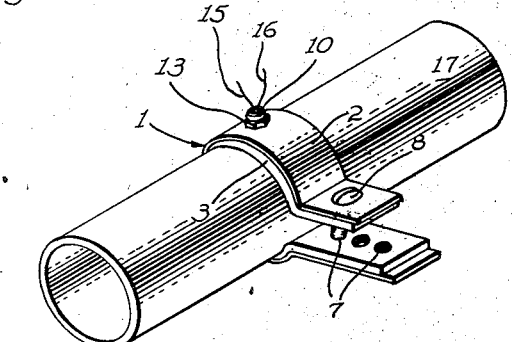
Fig. 4 is a view in perspective showing a device of the present invention applied to a pipe or conduit.

Referring to Fig. 4 of the drawing, a thermocouple junction embodying the present invention is shown applied to a fluid pipe or conduit 17 with the junction or contact 14 of the device disposed in efficient thermal conductive engagement with the surface of the pipe for accurate determination of the temperature thereof.

From the foregoing, it will be observed that the present invention provides a novel thermocouple junction that may be readily and quickly applied to and removed from objects of generally circular cross-section shape such as, for example, electric cables, fluid pipes and conduits, rods, bearings and the like. The invention also provides a novel thermocouple junction that may be attached mechanically to such objects without the use of solder or welding that might result in damage thereto. Furthermore, the invention provides a device that is highly efficient in operation and characterized by its relatively simplified, inexpensive construction.

While a particular embodiment of the invention has been illustrated and described herein, it is not intended that the invention be limited to such disclosure, and it is contemplated that changes and modifications may be made and incorporated within the scope of the following claim.

The invention described herein may be manufactured and used by or for the Government of the United States of America for governmental purposes without the payment of any royalties thereon or therefor.

What is claimed is:

A thermocouple comprising an elongated flexible body arranged to encircle an object, a flexible liner of thermally insulating material secured to said body and arranged for surface engagement with the object encircled, said body and said liner having an aperture therein, an insulating sleeve having a flange at one end thereof, said sleeve being received by said aperture so that the flange thereof engages said flexible liner, a contact element of a material having high electrical conducting properties secured to said flange and adapted to contact said object, means for securing said sleeve to said flexible body and liner, a pair of thermocouple conductors having dissimilar properties fixedly connected to said contact element, said insulating sleeve preventing contact between the contact element and the associated pair of thermocouple conductors, and the flexible body, and means to clamp said body tightly about the object whereby the contact element is held in tight engagement with the surface of the object.

JAMES W. KEHOE.

REFERENCES CITED

The following references are of record in the file of this patent:

UNITED STATES PATENTS

| Number | Name | Date |
|---|---|---|
| 1,140,701 | Mitchell | May 25, 1915 |
| 1,528,383 | Schmidt | Mar. 3, 1925 |
| 1,724,528 | Springer | Aug. 13, 1929 |
| 2,022,515 | Orchard | Nov. 26, 1935 |
| 2,375,870 | Ray | May 15, 1945 |
| 2,379,568 | Ellinwood | July 3, 1945 |
| 2,416,063 | Nicholls | Feb. 18, 1947 |
| 2,425,153 | Harrison | Aug. 5, 1947 |

FOREIGN PATENTS

| Number | Country | Date |
|---|---|---|
| 178,597 | France | Feb. 8, 1934 |

OTHER REFERENCES

Underwood et al.: Automotive Industries, page 573, June 15, 1940.

Houghten et al.: Temperature, its Measurement and Control in Science and Industry (1941), page 857.

Revere Bulletin, page 2, December 7, 1944.